United States Patent
Henderson

(10) Patent No.: US 6,764,670 B2
(45) Date of Patent: Jul. 20, 2004

(54) REMOVAL OF THIOTHIONYLFLUORIDE FROM SULFUR TETRAFLUORIDE

(75) Inventor: Philip Bruce Henderson, Wescosville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 284 days.

(21) Appl. No.: 10/016,034

(22) Filed: Nov. 1, 2001

(65) Prior Publication Data

US 2003/0082086 A1 May 1, 2003

(51) Int. Cl.$^7$ ................................................ C01B 17/45
(52) U.S. Cl. .................. 423/469; 423/467; 423/240 R; 423/240 S
(58) Field of Search ............................ 423/467, 240 R, 423/240 S, 469, 489

(56) References Cited

U.S. PATENT DOCUMENTS

| | | | |
|---|---|---|---|
| 2,992,073 A | | 7/1961 | Tullock ........................ 23/205 |
| 3,000,694 A | * | 9/1961 | Smith et al. ................. 423/276 |
| 3,393,977 A | * | 7/1968 | Langer ........................ 423/467 |
| 3,950,498 A | | 4/1976 | Appel et al. ................. 423/469 |
| 4,082,839 A | * | 4/1978 | Eibeck et al. ............... 423/489 |

FOREIGN PATENT DOCUMENTS

| CA | 634467 | * | 1/1962 | ................. 423/467 |
|---|---|---|---|---|

OTHER PUBLICATIONS

Air Products and Chemicals, Inc. Publication (www.airproducts.com/fluorination/sulfur.asp;) 2001 Seel, "Lower Sulfur Fluorides" in 16 *Adv. Inorg. Chem. Radiochem*, 297, 303–304 (1974) no month.

* cited by examiner

Primary Examiner—Ngoc-Yen Nguyen
(74) Attorney, Agent, or Firm—Michael Leach

(57) ABSTRACT

A process for removing thiothionylfluoride from a composition containing sulfur tetrafluoride and thiothionylfluoride includes contacting the composition with a high surface area material, such as activated carbon. The process can provide purified sulfur tetrafluoride free of thiothionylfluoride. The high surface area material can be replaced for further processing. Alternatively, the material can be regenerated by contacting it with a gas mixture of oxygen and nitrogen at 150–450° C. and converting the adsorbed elemental sulfur to sulfur dioxide without oxidation of the material.

19 Claims, No Drawings

REMOVAL OF THIOTHIONYLFLUORIDE FROM SULFUR TETRAFLUORIDE

BACKGROUND OF THE INVENTION

This invention relates to providing pure sulfur tetrafluoride ($SF_4$). More particularly, it relates to the removal of thiothionylfluoride ($S=SF_2$) from $SF_4$ by contacting the impure $SF_4$ with a high surface area material, such as activated carbon.

Sulfur tetrafluoride is an extremely useful fluorinating agent, which is particularly suited for the fluorination of oxygen-, sulfur- and nitrogen-containing groups bonded to non-metal or metal atoms. See, e.g., U.S. Pat. No. 3,950,498 to Appel et al. According to a publication of Air Products and Chemicals, Inc. (http://www.airproducts.com/fluorination/sulfur.asp; 2001), $SF_4$ is particularly useful for deoxofluorinating aldehydes, ketones and carboxylic acids in the presence of hydrogen fluoride (HF) and other Lewis acid catalysts.

$SF_4$ can be produced by a variety of methods. For example, U.S. Pat. No. 2,992,073 to Tullock describes a process for producing $SF_4$ comprising reacting an alkali metal fluoride (wherein the alkali metal is Na, K, Rb or Cs) with a chlorine-supplying reactant (e.g., elemental Cl, etc.) and sulfur-supplying reactant (e.g., elemental S, etc.).

U.S. Pat. No. 3,950,498 to Appel et al. describes a process for the production of sulfur tetrafluoride, wherein sulfur tetrachloride or mixtures consisting of sulfur dichloride and chlorine are reacted with hydrogen fluoride in the presence of a carbon tetrahalide to provide $SF_4$.

A problem with existing methods for manufacturing $SF_4$ is the production of undesirable byproducts that contaminate the $SF_4$. Such impurities can hinder the usefulness of $SF_4$ as a fluorinating agent.

Thiothionylfluoride is a particularly undesirable $SF_4$ contaminant. Thiothionylfluoride is typically observed in $SF_4$ compositions at concentrations of 5% or more. Although thermally stable, $S=SF_2$ can undergo a disproportionation reaction to produce elemental sulfur when using $SF_4$ as a raw material. The elemental sulfur byproduct can interfere with the $SF_4$ chemistry and foul the processing systems.

Seel, "Lower Sulfur Fluorides" in 16 *Adv. Inorg. Chem. Radiochem*, 297, 303–304 (1974), describes a process for converting pure $S=SF_2$ to $SF_4$ and elemental sulfur using catalysts, such as HF or $BF_3$. Although Seel does not address the problem of removing $S=SF_2$ from $SF_4$, the inventor is aware of a proprietary process for removing $S=SF_2$ from $SF_4$, which employs the same chemistry as described by Seel to disproportionate $S=SF_2$ to form $S_8$ and $SF_4$ using HF (or $BF_3$). However, this process is both inefficient and dangerous because it causes significant losses of $SF_4$ and requires using large quantities of HF. The HF catalyst becomes deactivated during the disproportionation, because of the formation of the salt $SF_3^{+HF}{}_2^-$ ($BF_3$ catalyst becomes deactivated by formation of the analogous salt with $SF_4$). Thus, in order to have sufficient free HF present to initiate the disproportionation of $S=SF_2$, at least 30 mole % of HF must be mixed with the contaminated $SF_4$. While this method produces $SF_4$ free of impurities, about 20–25% of the $SF_4$ is unrecoverable from the HF. The proprietary process is dangerous in that it involves handling large quantities of liquid anhydrous HF. HF is a gas under standard conditions, and reacts violently with many materials including glass. It can permeate large areas rapidly, and is extremely dangerous to humans. It is, therefore, desirable to avoid handling large quantities of HF.

The use of high surface area materials, such as activated carbon, zeolites, and silica, for separation processes is known. However, the inventor is not aware of any prior art disclosing the use of high surface area materials for removal of $S=SF_2$ from $SF_4$.

Accordingly, it is desired to provide a safer and more efficient process for removal of $S=SF_2$ from $SF_4$.

All references cited herein are incorporated herein by reference in their entireties.

BRIEF SUMMARY OF THE INVENTION

The invention provides a process for removing thiothionylfluoride from a composition containing sulfur tetrafluoride and an initial concentration of thiothionylfluoride. The process comprises: contacting the composition with an activated carbon; reacting at least a portion of the thiothionylfluoride to form elemental sulfur; and recovering a purified composition containing the sulfur tetrafluoride and the thiothionylfluoride at a reduced concentration less than the initial concentration.

Also provided is a process for removing thiothionylfluoride from a composition containing sulfur tetrafluoride and an initial concentration of thiothionylfluoride, which process comprises: contacting the composition with a metal oxide-free material having a surface area of at least 400 $m^2/g$; reacting at least a portion of the thiothionylfluoride to form elemental sulfur; and recovering a purified composition containing the sulfur tetrafluoride and thiothionylfluoride at a reduced concentration lower than the initial concentration.

DETAILED DESCRIPTION OF THE INVENTION

The inventive process comprises the use of a high surface area material for removing thiothionylfluoride from a composition containing sulfur tetrafluoride and thiothionylfluoride. As used herein, the term "high surface area material" means materials having a surface area of at least 400 $m^2/g$. Preferred high surface area materials of the invention have a surface area of about 800 to about 1000 $m^2/g$.

The most preferred type of high surface area material is activated carbon, particularly activated carbon having a minimum number of oxygen-containing active sites. Depending on how the carbon is activated, activated carbon possesses varying amounts of oxygen at active sites, usually in the form of carboxyl, carbonyl, or hydroxyl groups. These functional groups will also react with $SF_4$ to produce $SO_2$ or $SOF_2$. Thus, the preferred activated carbons (and high surface area materials in general) are those with the least amount of oxygen-containing active sites.

In the absence of any readily available direct analysis to quantify oxygen-containing active sites on activated carbon, relative comparisons can be made between different activated carbons. The relative quantity of oxygen-containing sites can be determined by $SO_2$ and $SOF_2$ produced upon exposure to $SF_4$ and the relative capacities for $S=SF_2$ can be measured by column experiments. If two activated carbons are equivalent in amount of oxygen-containing active sites, then the carbon with the greater surface area will be preferred.

While high surface area materials other than activated carbon promote the disproportionation of $S=SF_2$ to $S_8$ and $SF_4$, the material used in the inventive process must be compatible with $SF_4$. The use of activated carbon is preferred because it does not react with $SF_4$. It is preferred to avoid employing high surface area materials containing metal oxides, such as alumina or zeolites, as such materials react with $SF_4$ to form $SO_2$ or $SOF_2$.

The high surface area material can be brought in contact with the composition to be purified by a variety of means. In a preferred embodiment, the material is provided in the form of a bed in a column (preferably stainless steel) through which the composition to be purified is passed.

The capacity of high surface area materials to remove thiothionylfluoride from sulfur tetrafluoride varies, but can be determined through routine experimentation using the instant disclosure as a guide. In preferred embodiments, a maximum of 800 grams, more preferably, 150 grams of the material are provided per mole of the thiothionylfluoride being reacted to form elemental sulfur and sulfur tetrafluoride through the disproportionation reaction.

The composition to be purified (typically, but not necessarily, containing at least 8% v/v thiothionylfluoride) is contacted with the high surface area material, for example in a column as noted above, and the resulting effluent is collected and monitored for the presence of sulfur tetrafluoride and/or thiothionylfluoride. The presence of thiothionylfluoride in the effluent is preferably detected by monitoring the ultraviolet absorbance at 240 nm and/or 290 nm. FT-IR is preferably used to detect the presence of other potential impurities, such as $SO_2$ and $SOF_2$, and to determine the time to $SF_4$ breakthrough. A purified composition completely free of thiothionylfluoride can be obtained by collecting only those fractions of the effluent that do not emit signals indicative of thiothionylfluoride.

The flow rate of the composition to be purified is 0.1 to 5, more preferably 0.4 to 1 lb-mole/ft$^2$/hr.

As the process is conducted, the effectiveness of the high surface area material is depleted. In particular, elemental sulfur from the disproportionation reaction is deposited on the high surface area material, requiring that the material be replaced or regenerated. The material can be regenerated by contacting the material with a gas mixture containing oxygen and nitrogen to convert elemental sulfur adsorbed to the material to sulfur dioxide without oxidation of the material. The gas mixture preferably comprises 1 to 21 vol. % oxygen and 79 to 99 vol. % nitrogen. More preferably, the gas mixture is air. The gas mixture is preferably provided at a temperature of 250–300° C. and a flow rate so as to maintain an oxidation rate such that a reaction zone temperature does not exceed 400° C. In embodiments, the oxidation rate is maintained at 9–1000 µg/min. It is preferred to purge volatile adsorbed species from the spent material with inert gas prior to conducting the regeneration process. Preferred inert gases include the noble gases, nitrogen and carbon dioxide, with nitrogen gas and argon gas being most preferred.

The invention is illustrated below in more detail with reference to the following examples, but it should be understood that the present invention is not deemed to be limited thereto.

EXAMPLE 1

Removal of S=$SF_2$ from $SF_4$ Using Pacific Activated Carbon

A 2.8 cm (internal diameter)×37 cm stainless steel column (0.23 L) was filled with 104 g of Pacific activated carbon. The column was heated externally in two zones with resistive heat tape to an internal temperature of 150° C. under 0.5 standard liters per minute (sLpm) $N_2$ flow for 15 hours to activate the carbon. The column was cooled to room temperature and $SF_4$ containing 8% v/v S=$SF_2$ was passed through the column. The S=$SF_2$ concentration was monitored by UV ($\epsilon_{240nm}$=515 L/mol/cm, $\epsilon_{290nm}$=128 L/mol/cm) with a 10 cm path cell. The stream was also monitored by FT-IR for detection of other potential impurities, such as $SO_2$ and $SOF_2$, and to determine the time to $SF_4$ breakthrough on the column. After 3.5 sL of $SF_4$ were introduced on the column, $SF_4$ free of S=$SF_2$ was observed in the effluent from the column, along with small amounts of $SOF_2$ and $SO_2$. After 10 sL of $SF_4$ were introduced on the column, $SOF_2$ and $SO_2$ were no longer observed. After 160 sL of $SF_4$ had been purified, S=$SF_2$ was observed at the column exit. After the run was completed, the column was heated to 100° C. under a 1 sLpm $N_2$ flow to remove the volatile adsorbed species. 150 g of material was recovered from the column. Elemental analysis showed that nearly all of the mass gain was due to uptake of elemental $S_8$.

Data from additional runs using different carbons are shown in Table 1.

TABLE 1

S = $SF_2$ capacities of various carbons.

| Carbon | Surface Area (m$^2$/g) | sL $SF_4$ Purified before S = $SF_2$ Breakthrough | Comments |
|---|---|---|---|
| Pacific | 890 | 160 | Some $SOF_2$, $SO_2$ |
| Norit | 880 | 180 | Some $SOF_2$, $SO_2$ |
| Barnaby Sutcliff | 953 | 270 | Little $SOF_2$, $SO_2$ |
| Westvaco | 2260 | 50 | Large amounts of $SOF_2$, $SO_2$ |
| Aldrich | 621 | 31 | Large amounts of $SOF_2$, $SO_2$ |
| Darco | 441 | 10 | Very large amounts of $SOF_2$, $SO_2$ |

In general, the greater the amount of $SOF_2$ or $SO_2$ observed during the purification, the lower the capacity of the carbon for S=$SF_2$. In other words, the thiothionylfluoride capacity of the high surface area material is inversely correlated to the amount of $SOF_2$ and $SO_2$ generated.

EXAMPLE 2

Regeneration of the Pacific Carbon Capacity for S=$SF_2$

The run of Example 1 was repeated without removing the spent carbon from the column. 160 sL of $SF_4$ were purified prior to S=$SF_2$ breakthrough. The column was heated to 280° C. under a flow of 0.4 sLpm air. The production of $SO_2$ from the oxidation of the sulfur was monitored by FT-IR. A sharp temperature spike of about 50–80° C. slowly moving down the bed indicated the sulfur-$O_2$ reaction zone. After the reaction zone had traversed the column, the airflow was stopped. After cooling the carbon to room temperature, $SF_4$ containing 8% v/v S=$SF_2$ was passed through the column in a similar manner to Example 1. S=$SF_2$ was observed to breakthrough the column after 165 sL of $SF_4$ was passed, showing that all of the S=$SF_2$ capacity was recovered by the air regeneration. No additional amounts of $SO_2$ or $SOF_2$ were observed over what was observed in Example 1, showing that the regeneration air did not react significantly with the activated carbon to form additional oxygenated active sites.

Additional air regeneration runs were made at 200° C. and 350° C. At 200° C. the production of $SO_2$ was slow and only about ⅓ of the S=$SF_2$ capacity was recovered. At 350° C. the entire S=$SF_2$ capacity was recovered.

During the regeneration of the carbon, it is important not to react the carbon surface with $O_2$, because this will form $SF_4$-reactive sites on the regenerated carbon. In order to find the maximum regeneration temperature prior to carbon reaction, a thermogravimetric analysis of carbon was performed.

EXAMPLE 3

Mass Loss of Unreacted Carbon in Air by Thermogravimetric Analysis (TGA)

During the TGA experiment, a few milligrams of Pacific activated carbon were exposed to air at various temperatures while monitoring its mass. Reaction with air is indicated by loss of mass through conversion to volatile $CO_2$ and CO. At 200° C., mass loss is less than 1 $\mu$g/min, while at 300° C. the mass loss is approximately 5 $\mu$g/min. At 400° C., a mass loss of over 1000 $\mu$g/min was observed.

EXAMPLE 4

Mass Loss of Reacted Carbon in Air by Thermogravimetric Analysis (TGA)

The TGA experiment of Example 3 was repeated on Pacific carbon containing deposited elemental sulfur after the purification of $SF_4$. At 200° C., the mass loss is 9 $\mu$g/min, while at 300° C., the mass loss is over 200 $\mu$g/min.

These results show that elemental sulfur reacts approximately 40 times faster than the activated carbon. Thus, the optimum feed air temperature range for the regeneration is 250–350° C. In this range, the elemental sulfur reacts to form the volatile $SO_2$, but the carbon itself is not oxidized.

The following comparative example demonstrates that not all high surface area materials can be used to remove $S=SF_2$ from $SF_4$. Particularly, if the proposed catalyst is composed of metal oxide, it will react with $SF_4$.

COMPARATIVE EXAMPLE

Use of 13X

The system of Example 1 was used to test 136 g of Na-FAU (13X) as a catalyst for removing $S=SF_2$ from $SF_4$. The 13X was activated by heating the column to 260° C. over a 1 sLpm flow of $N_2$ for 17 hours. The column was cooled prior to running $SF_4$. 5% $SF_4$ in $N_2$ was flowed over the 13X at 2 sLpm. The column temperature rose to 130° C. due to the heat of reaction. It is significant that while no $S=SF_2$ was observed at the column exit, neither was $SF_4$. Only $SO_2$ and $SOF_2$ were observed. The $SF_4$ flow was stopped and the column heated to 250° C. with a 1 sLpm $N_2$ flow to removed any adsorbed species. An X-ray diffraction (XRD) analysis of the recovered 13X showed the zeolite framework was destroyed by exposure to the $SF_4$.

In view of the foregoing examples and disclosure, it should be apparent that the present invention provides a safer and more economical process for removal of $S=SF_2$ from $SF_4$. Using a high surface area material, such as activated carbon, in place of the toxic HF allows recovering nearly all of the $SF_4$ versus 25% losses for the HF method. Moreover, the instant invention accomplishes the desired removal with less danger to the environment.

While the invention has been described in detail and with reference to specific examples thereof, it will be apparent to one skilled in the art that various changes and modifications can be made therein without departing from the spirit and scope thereof.

I claim:

1. A process for removing thiothionylfluoride from a composition containing sulfur tetrafluoride and an initial concentration of thiothionylfluoride, said process comprising:

contacting said composition with an activated carbon;

reacting at least a portion of said thiothionylfluoride to form elemental sulfur; and recovering a purified composition containing said sulfur tetrafluoride and said thiothionylfluoride at a reduced concentration less than said initial concentration.

2. The process of claim 1, wherein said activated carbon has a surface area of about 800 to about 1000 $m^2/g$.

3. The process of claim 2, wherein said activated carbon has less oxygen-containing active sites than an activated carbon having a surface area of 2260 $m^2/g$.

4. The process of claim 1, wherein said activated carbon is free of metal oxides.

5. The process of claim 1, wherein said contacting comprises loading said composition on a bed of said activated carbon in a column.

6. The process of claim 1, wherein a maximum of 800 grams of said activated carbon are provided per mole of said thiothionylfluoride being reacted.

7. The process of claim 1, wherein said recovering comprises monitoring signals emitted from an effluent flowing from a bed of said activated carbon and collecting said purified composition as a fraction of said effluent emitting said signals indicative of said sulfur tetrafluoride and contraindicative of said thiothionylfluoride.

8. The process of claim 7, wherein said signals are monitored by ultraviolet spectroscopy and infrared spectroscopy.

9. The process of claim 1, wherein said initial concentration of thiothionylfluoride is at least 8% v/v.

10. The process of claim 1, wherein said reduced concentration is 0 to 0.3% v/v.

11. The process of claim 1, wherein said purified composition is free of thiothionylfluoride.

12. The process of claim 1, further comprising activating said activated carbon prior to said contacting by heating a carbonaceous material to at least 150° C. under an inert gas atmosphere for at least 8 hours and cooling to room temperature.

13. The process of claim 1, further comprising replenishing said activated carbon from which said purified composition is obtained by contacting said activated carbon with a gas mixture containing oxygen and nitrogen to convert elemental sulfur adsorbed on said activated carbon to sulfur dioxide without oxidation of said activated carbon.

14. The process of claim 13, wherein said gas mixture is air.

15. The process of claim 14, wherein said air is provided at a temperature of 250–300° C. and an airflow rate is provided so as to maintain an oxidation rate such that a reaction zone temperature does not exceed 400° C.

16. The process of claim 15, wherein said oxidation rate is 9–1000 $\mu$g/min.

17. The process of claim 1, further comprising replenishing said activated carbon from which said purified composition is obtained by replacing said activated carbon with fresh activated carbon.

18. A process for removing thiothionylfluoride from a composition containing sulfur tetrafluoride and an initial concentration of thiothionylfluoride, said process comprising:

contacting said composition with a material having a surface area of at least 400 m2/g, wherein said material is free of metal oxides;

reacting at least a portion of said thiothionylfluoride to form elemental sulfur; and recovering a purified composition containing said sulfur tetrafluoride and said thiothionylfluoride at a reduced concentration less than said initial concentration.

19. The process of claim 18, wherein said material is activated carbon.

* * * * *